United States Patent [19]
Yeh

[11] 4,079,482
[45] Mar. 21, 1978

[54] ELECTRONIC DATA PROCESSING OF CHINESE CHARACTERS

[76] Inventor: Chan H. Yeh, 532 Mercury Dr., Sunnyvale, Calif. 94086

[21] Appl. No.: 690,621

[22] Filed: May 27, 1976

[51] Int. Cl.² .............................................. B41J 1/02
[52] U.S. Cl. .................................. 197/1 A; 197/1 R; 235/487
[58] Field of Search .............................. 197/1 A, 1 R; 235/61.12 R, 61.12 M, 61.12 N; 340/146.3 Z

[56] References Cited

U.S. PATENT DOCUMENTS

| | | | |
|---|---|---|---|
| 1,245,633 | 11/1917 | Sugimoto | 197/1 A |
| 2,350,893 | 6/1944 | Hofgaard | 197/1 R |
| 3,663,802 | 5/1972 | Wildhaber | 235/61.12 M X |
| 3,719,262 | 3/1973 | Taplin | 197/1 R |
| 3,896,917 | 7/1975 | Taplin | 235/61.12 R X |

FOREIGN PATENT DOCUMENTS 785,605  10/1957  United Kingdom ................. 101/399

*Primary Examiner*—Paul T. Sewell
*Attorney, Agent, or Firm*—Wenderoth, Lind & Ponack

[57] ABSTRACT

In order to incorporate information such as Chinese characters in humanly-readable and machine-readable form onto a single character block font a multi-bit and preferably a 14-bit binary code which uniquely identifies each of the more than 10,000 Chinese characters or other information and which is machine-readable has been developed. The 14-bit binary code has been further coded into a machine-readable 7-line code or electronic equivalent thereof which is small enough to be incorporated onto a single character block font together with the humanly-readable character.

10 Claims, 9 Drawing Figures

ELECTRONIC DATA PROCESSING OF CHINESE CHARACTERS

This invention relates to a system for encoding binary information for the electronic data processing of complex characters and in particular Chinese characters.

This invention is related to my prior U.S. Pat. No. 3,820,644 issued June 28, 1974 and entitled "System for the Electronic Data Processing of Chinese Characters," the disclosure of which is incorporated herein by reference. In my aforesaid prior U.S. patent there is described a method by which each of the approximately 10,000 Chinese characters can be assigned a unique 14-bit binary code so that each character is uniquely identified. For example the Chinese character 北 (Pei or North) is assigned a unique decimal number 10165 which has an equivalent binary representation 01000100000101. A keyboard is so designed that each character can be easily accessed electronically by pressing not more than three keys on the keyboard at speeds far in excess of that possible by human encoding. It is, however, sometimes desirable that Chinese characters be both human-readable and machine-readable and it will be appreciated that a standard Chinese typewriter is not adapted to type both human readable characters and the somewhat cumbersome 14-bit binary code which is machine readable. It is, therefore, obvious that the machine readable 14-bit binary code must be further reduced to a line code which is also machine readable. Line codes for representing the Roman alphabet are known to the art, for example in U.S. Pat. No. 3,657,522 entitled "Record for Machine Scanning" issued Apr. 18, 1972 to Wildhaber, in which each letter of the alphabet is assigned a number from 1 to 26 which is then transcribed in binary form so that, for example, the second letter of the alphabet B can be written as 00010 or as merely a bar in the fourth position from the left or start. For convenience a short bar is provided preceding each coding to indicate the start of a code, thus A can be represented by '. . . 1, B can be represented by '. . . 1 ., C can be represented by '. . . 11, and so on for all 26 characters of the alphabet. It will be appreciated that even 26 characters requires a relatively large and clumsy binary layout containing a marker and 5 binary bar positions. The difficulties encountered when encoding 10,000 or more characters are immeasurably greater, and as has been indicated in my prior patent a 14-bit binary notation is the simplest which can be used to uniquely identify all 10,000 or so Chinese characters. Even with modern scanning equipment which can read or scan lines 0.01 inches wide and 0.2 inches high the space required for a 15 bar code (a marker bit plus 14 information bits) is too great for the bar code to be incorporated on a character font of a Chinese typewriter.

It will be appreciated that although this invention is particularly suitable for encoding identity information for Chinese characters, it is not restricted thereto. Other forms of information which can be represented in a binary notation can also be encoded according to the principles of the present invention. While the invention is particularly suitable for encoding 14-bit binary representations the invention is equally applicable to any longer or shorter even numbered binary representations.

It is, therefore, a primary object of the present invention to provide a method whereby a multi digit binary representation of desired information can be encoded in such a way that the final form of the code is sufficiently small to be mounted on a single character font.

It is another object of the present invention to provide a system for encoding Chinese characters so that the regular human-readable character and a special machine-readable code can be incorporated on a single lead font character block which can be incorporated into a regular form Chinese typewriter.

Yet another object of this invention is to provide a novel Chinese typewriter which incorporates lead font character blocks for printing both human-readable and machine readable Chinese characters.

Thus, by one aspect of this invention there is provided a method for encoding information which can be represented by an even number of binary bits, which comprises:

(a) assigning a line of a selected length to each 0-bit and a line of a different selected length to each 1-bit of said binary thereby establishing a line code for said even number of binary bits;
(b) dividing said line code along its length into equally sized first and second segments;
(c) inverting one of said segments;
(d) aligning the lines of said first and second segments; and
(e) disposing said aligned lines in abutting relationship along a common axis, thereby forming a line code having an odd number of lines which is uniquely representative of said even number of binary bits.

By another aspect of this invention there is provided a lead font character block, for use in a Chinese typewriter, having incorporated thereon a humanly-readable Chinese character and a machine-readable line code corresponding to said Chinese character.

The invention will be described in more detail hereinafter with reference to the accompanying drawings in which.

Figure 1:
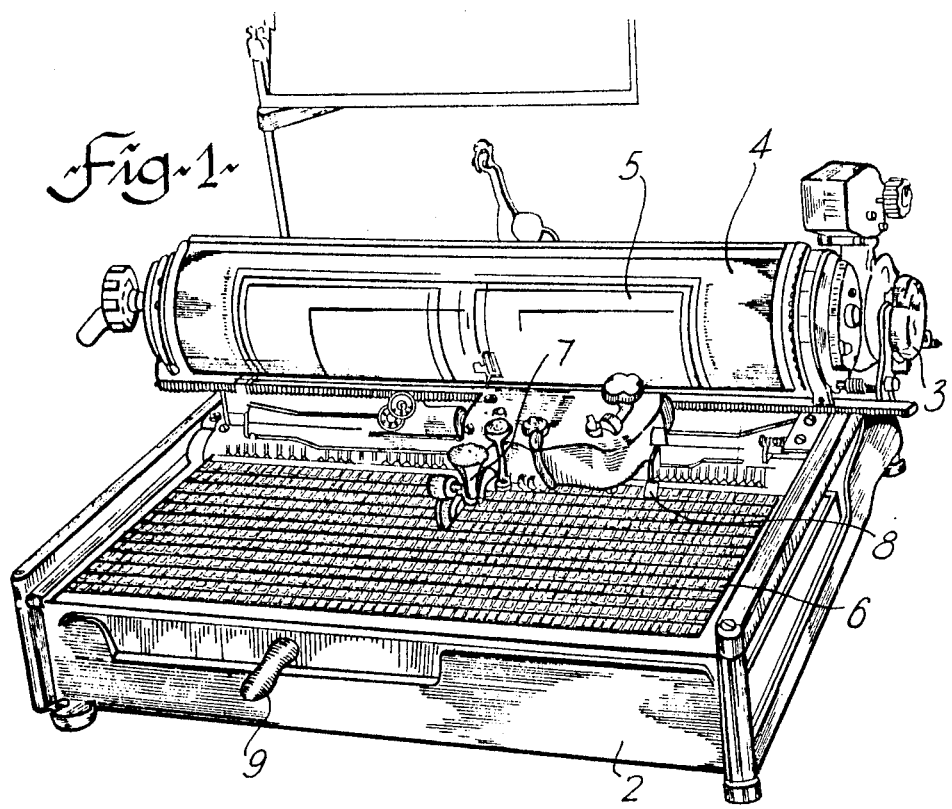
FIG. 1 is a perspective view of a Chinese typewriter provided with a plurality of lead font character blocks.

Turning firstly to FIG. 1 there is shown a Chinese typewriter having a base 2, a slidable carriage 3 and roller 4 around which the record medium 5 such as a sheet of paper is wound in conventional manner. In place of the conventional keys in a standard western-style typewriter, a plurality of rows of lead font character blocks 6 are provided each adapted to be lifted out of its storage position to a printing position by means of a hammer mechanism 7 on movement of selector 8 and actuator lever 9. In a standard Chinese typewriter the character fonts are similar in size and shape to the font 6 shown in FIG. 2 but are embossed with the appropriate human-readable character 10 only. In the present invention, however the character font is also provided with an 8-line machine-readable code 11 which is generated according to the principles described in more detail hereinafter.

Figure 3:
FIG. 3 is a sketch of a machine-readable 14-line code representing a 14-bit binary representation.
Figure 5:
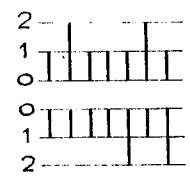
FIG. 5 is a ketch of the 14-line code of FIG. 4 in which the bottom 7-line segment is inverted.
Figure 4:
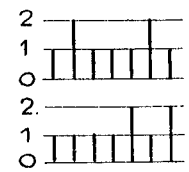
FIG. 4 is a sketch of the 14-line code of FIG. 3 broken into two 7-line segments.
Figure 6:
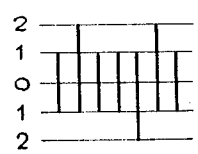
FIG. 6 is a sketch showing the segments of FIG. 5 joined to form a new 7-line code.
Figure 8A:
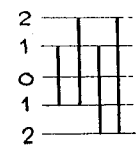
FIG. 8a is a sketch showing the 4 possible line length and positions for the code of FIG. 6.

As described in my prior U.S. Pat. No. 3,820,644 each of the approximately 10,000 Chinese characters can be assigned a unique 14-bit binary code which serves to uniquely identify each character. For example 北 ("Pei" or North) is assigned the number 10165 which can be defined in an equivalent binary form as 01000100000101. As machines can be programmed to read binary codes either on the basis of go-no-go or by scanning the length of a line, a machine-readable code in which both the 0 and 1 represented by a line can be developed. Thus a short line represents 0 and a long line (twice the length of the short line) represents 1, and the 14-bit binary code for Pei can be represented as shown in FIG. 3. This 14-line code is still too long to be incorporated onto a font 6, which is only of the order of 0.25 inch wide. The next step, therefore, is to break the 14-line code into two 7-line segments and place one segement vertically above the other as shown in FIG. 4. In order to prevent undue or unnecessary superimposition the bottom segment is inverted, as shown in FIG. 5. The two segments are then joined as shown in FIG. 6 to provide a 7-line code which uniquely defines the 14-bit binary representation of the decimal coding of each Chinese character. It will be appreciated that there are only four possible notations for the derived code lines, which vary in length from 2-4 lengths inclusive, that is 4 lengths (2-2), 3 lengths (2-1, 1-2), and 2 lengths (1-1) —the numbers in brackets referring to the line references in FIGS. 6 and 8a always reading from the top downwardly. Surprisingly, it has been found that these four possible lengths are sufficient to uniquely define the 14-bit binary codings necessary to define all 10,000 or so Chinese characters.

Optical readers are, of course, known in the art and commercially available readers are capable of reading or scanning lines which are 0.01 inches wide and 0.2 inches high and which are spaced by 0.01 inches. Thus the 7-line code described above can be compressed into a space of 0.14 inches and hence can be embossed on the font of FIG. 2, so that both machine and humanly readable characters can be provided on a single font.

Figure 7:
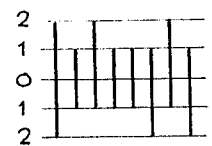
FIG. 7 is a sketch showing the code of FIG. 6 with a lead or start line.

In a preferred embodiment of the present invention, a lead line is added to the 7-line code, as shown in FIG. 7, in order to indicate to the reading machine the start of the line code and to reset the machine status. In this embodiment it will be appreciated that the width of the machine-readable code will be about 0.16 inches.

Figure 2:
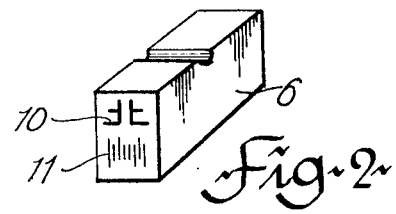
FIG. 2 is a perspective view of a lead font character block of a preferred embodiment of the present invention.

It will also be appreciated that Chinese may either by read in horizontal style, from left to right or in vertical style from the top down and from right to left. The human-readable and machine-readable code may therefore be embossed on the font as shown in FIG. 2 or as 北 ⌶

Figure 8B:
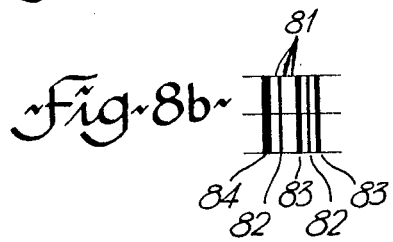
FIG. 8b is a sketch showing an electronic equivalent of the code of FIG. 7.

In a further embodiment of this invention the 7 or 8-line code can be modified to be compatible with alternative optical readers using different logic designs and which are also commercially available. Thus the 4-line lengths described hereinabove with reference to FIG. 6 can be represented by bars of different width as desired. As shown in FIG. 8b, the shortest length of line in FIG. 8a can be represented by a blank space, 81, the next larger can be represented by a bar 82 of say 0.01 inches width, the third longest can be represented by a bar 83 of 0.02 inches width and the longest can be represented by a bar 84 of 0.03 inches width so that the 8-line code of FIG. 7 can be written in an electronically equivalent form as shown in FIG. 8b. Other modifications of the final readout form code will suggest themselves to those skilled in the art, without departing from the scope of this invention as defined in the appended claims. As previously indicated, although specific reference has been made to the encoding of information to uniquely define Chinese characters, the principles of the encoding system can be applied to many other forms of information which can be represented by an even number of binary bits and a line code can be developed with any number of lines depending upon the complexity of the information which is codified.

I claim:

1. A method for encoding information which can be represented by an even number of binary bits, which comprises:
   (a) assigning a line of a selected length to each 0-bit and a line of a different selected length to each 1-bit of said binary bits thereby establishing a line code for said even number of binary bits;
   (b) dividing said line code along its length into equally sized first and second segments;
   (c) inverting one of said segments;
   (d) aligning the lines of said first and second segments; and
   (e) disposing said aligned lines in abutting relationship along a common axis, thereby forming a line code having an odd number of lines which is uniquely representative of said even number of binary bits.

2. A method as claimed in claim 1 wherein said information to be encoded is Chinese characters which can be represented by a 14-bit binary.

3. A method as claimed in claim 1 further comprising converting different lines into equal length lines of differing width which can be optically scanned.

4. A method as claimed in claim 3 wherein said equal length lines have widths varying between zero and three line widths.

5. A method as claimed in claim 2 wherein a humanly-readable Chinese character and a machine readable said line code are inscribed on a single character font for a Chinese typewriter, whereby humanly-readable and machine-readable characters can be typed simultaneously.

6. A lead font character block, for use in a Chinese typewriter, having incorporated thereon a humanly-readable Chinese character and a machine-readable line code corresponding to said Chinese character, and having an even number of binary bits each 0-bit being represented by a line of a selected length and each 1-bit being represented by a line of a different selected length, the lines each having one end aligned in a straight line, said line code having first and second segments each having the same number of lines therein, one of said segments being inverted with respect to the other and the lines of said first and second segments being aligned with each one ends of the aligned lines in abutting relationship, thereby forming a line code having an odd number of lines which is uniquely representative of said even number of binary bits.

7. A character block as claimed in claim 6 wherein said line code is a 7-line code derived from 14-bit binary information identifying said Chinese character.

8. A character block as claimed in claim 6 wherein said line code further has a line for providing a lead check to a reading machine.

9. A lead font character block for use in a Chinese typewriter having incorporated therein a humanly-readable Chinese character and a machine-character line code corresponding to said Chinese character and having an even number of binary bits, each 0-bit being represented by a line of a selected width and each 1-bit being represented by a line of a different selected width, the lines each having one of the ends thereof aligned in a straight line, said line code having first and second segments each having the same number of lines therein, one of the segments being inverted with respect to the other, and the lines of the first segment being aligned with the lines of the same width in the second segment with each one end of the lines in abutting relationship, thereby forming a line code having an odd number of lines which is uniquely representative of said even number of binary bits.

10. A character block as claimed in claim 9 wherein said lines have widths varying between zero and three line widths.

* * * * *